US009460570B2

United States Patent
Ieda

(10) Patent No.: US 9,460,570 B2
(45) Date of Patent: Oct. 4, 2016

(54) DOOR LOCK CONTROL SYSTEM

(71) Applicant: AISIN SEIKI KABUSHIKI KAISHA, Kariya-shi (JP)

(72) Inventor: Kiyokazu Ieda, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/429,127

(22) PCT Filed: Sep. 13, 2013

(86) PCT No.: PCT/JP2013/074885
§ 371 (c)(1),
(2) Date: Mar. 18, 2015

(87) PCT Pub. No.: WO2014/046056
PCT Pub. Date: Mar. 27, 2014

(65) Prior Publication Data
US 2015/0221146 A1    Aug. 6, 2015

(30) Foreign Application Priority Data

Sep. 21, 2012 (JP) .................................. 2012-208549

(51) Int. Cl.
B60R 25/00 (2013.01)
G05B 19/00 (2006.01)
G05B 23/00 (2006.01)
G06F 7/00 (2006.01)
G06F 7/04 (2006.01)
G08B 29/00 (2006.01)
(Continued)

(52) U.S. Cl.
CPC ........... *G07C 9/00007* (2013.01); *B60R 25/24* (2013.01); *B60R 2325/103* (2013.01)

(58) Field of Classification Search
CPC .............. G07C 9/00007; B60R 25/24; B60R 2325/103
See application file for complete search history.

(56) References Cited

U.S. PATENT DOCUMENTS 6,710,471 B1    3/2004 Schmitz
8,410,898 B1 *  4/2013 Vasquez ............. G07C 9/00571
                                                    340/5.1
(Continued)

FOREIGN PATENT DOCUMENTS

DE    198 35 155 A1    2/2000
DE    198 45 649 A1    4/2000
(Continued)

OTHER PUBLICATIONS

Extended European Search Report issued Sep. 1, 2015 in Patent Application No. 13838461.5.
(Continued)

*Primary Examiner* — Erin File
(74) *Attorney, Agent, or Firm* — Oblon, McClelland, Maier & Neustadt, L.L.P.

(57) ABSTRACT

A door lock control system according to an embodiment includes, as one example, a receiving unit and a determination unit. The receiving unit is provided in a side edge portion extending between an upper edge portion and a lower edge portion of a window of a vehicle door, and receives a signal by near field communication. The determination unit determines whether to unlock or lock the door based on first data included in the signal received by the receiving unit and held second data.

7 Claims, 8 Drawing Sheets

(51) Int. Cl.
*G08C 19/00* (2006.01)
*H04B 1/00* (2006.01)
*H04B 3/00* (2006.01)
*H04Q 9/00* (2006.01)
*G07C 9/00* (2006.01)
*B60R 25/24* (2013.01)

(56) References Cited

U.S. PATENT DOCUMENTS

| | | | |
|---|---|---|---|
| 8,843,066 B2* | 9/2014 | Chutorash | G08C 17/02 |
| | | | 455/41.1 |
| 9,166,286 B2* | 10/2015 | Matsuoka | G06K 7/10881 |
| 2001/0026244 A1 | 10/2001 | Ieda et al. | |
| 2006/0290503 A1 | 12/2006 | Sumida et al. | |
| 2007/0030119 A1 | 2/2007 | Ono et al. | |
| 2007/0203850 A1* | 8/2007 | Singh | G06Q 20/327 |
| | | | 705/67 |
| 2012/0178367 A1* | 7/2012 | Matsumoto | G06K 19/0707 |
| | | | 455/41.1 |
| 2013/0244575 A1* | 9/2013 | Forutanpour | H04M 1/7253 |
| | | | 455/41.1 |
| 2013/0295845 A1* | 11/2013 | Maenpaa | H04B 5/0006 |
| | | | 455/41.1 |
| 2014/0009348 A1* | 1/2014 | Behin | H01Q 7/00 |
| | | | 343/726 |
| 2014/0027507 A1* | 1/2014 | Jonely | G07C 9/00658 |
| | | | 235/382 |
| 2014/0049366 A1* | 2/2014 | Vasquez | G07C 9/00857 |
| | | | 340/5.54 |
| 2014/0080411 A1* | 3/2014 | Konanur | H04B 5/0031 |
| | | | 455/41.1 |

FOREIGN PATENT DOCUMENTS

| | | |
|---|---|---|
| DE | 10 2006 023 052 A1 | 11/2007 |
| EP | 2 381 392 A1 | 10/2011 |
| FR | 2 963 711 A1 | 2/2012 |
| JP | 3562476 | 9/2004 |
| JP | 2008 57237 | 3/2008 |
| JP | 2008 79118 | 4/2008 |
| JP | 4140731 | 8/2008 |
| JP | 2009 256900 | 11/2009 |
| JP | 2010 222841 | 10/2010 |
| JP | 2012 167513 | 9/2012 |

OTHER PUBLICATIONS

International Search Report Issued Nov. 26, 2013 in PCT/JP13/074885 Filed Sep. 13, 2013.

* cited by examiner

DOOR LOCK CONTROL SYSTEM

CROSS-REFERENCE TO RELATED APPLICATIONS

This application is national stage application of International Application No. PCT/JP2013/074885, filed Sep. 13, 2013, which designates the United States, incorporated herein by reference, and which is based upon and claims the benefit of priority from Japanese Patent Application No. 2012-208549, filed Sep. 21, 2012, the entire contents of which are incorporated herein by reference.

FIELD

Embodiments of the present invention relate to a door lock control system.

BACKGROUND

Conventionally, as a system that controls locking and unlocking of a door, there has been known a door lock control system in which an antenna is provided to a door handle.

CITATION LIST

Patent Literature

Patent Literature 1: Japanese Patent No. 3562476

SUMMARY

Technical Problem

It is conceivable that, if near field communication is used for a door lock control system, convenience is improved. In such a door lock control system that uses near field communication, it is preferred to locate an antenna at a location where communication can easily be established with respect to a device (such as a mobile phone as an example) held by an operator (user).

Solution to Problem

As one example, a door lock control system according to an embodiment of the present invention comprises a receiving unit and a determination unit. The receiving unit is provided to a side edge portion extending between an upper edge portion and a lower edge portion of a window of a vehicle door, and receives a signal by near field communication. The determination unit determines whether to unlock or lock the door based on first data included in the signal received by the receiving unit and held second data. Therefore, as one example, an operator can relatively easily bring a device, which transmits the first data, close to the receiving unit at the time when the operator is moving into or out from the vehicle cabin.

In the door lock control system, as one example, the side edge portion includes a first member and a second member. The second member covers an outer side of the first member with respect to a vehicle cabin and is formed of a non-conductive material. The receiving unit is provided between the first member and the second member. Therefore, as one example, the receiving unit can be concealed in the side edge portion. In addition, as one example, reception by the receiving unit is hardly interrupted because the outer side of the member of the receiving unit with respect to the vehicle cabin is formed of a non-conductive material.

In the door lock control system, as one example, the receiving unit is attached to the second member. Therefore, the receiving unit can easily be attached and detached upon attachment and detachment of the second member on the outer side of the vehicle cabin. Further, as one example, the receiving unit can easily be provided to or removed from the vehicle by replacement of the second member.

In the door lock control system, as one example, the receiving unit includes an antenna, the first member is formed of a conductive material, and the door lock control system includes a magnetic member covering the antenna on the first member side. Therefore, as one example, reduction in the communication performance of the antenna due to the first member formed of the conductive material can easily be suppressed.

In the door lock control system, as one example, the receiving unit includes a waterproofed cover portion. Therefore, as one example, the receiving unit is difficult to be influenced by moisture.

In the door lock control system, as one example, a gap is provided between the first member and the second member and between the receiving unit and an end portion of the side edge portion in a vehicle front-and-rear direction. Therefore, as one example, water can easily passes through the gap, and thereby, it is difficult to have influence on the receiving unit.

In the door lock control system, as one example, the receiving unit includes an antenna and a circuit unit that processes a signal received by the antenna, and the side edge portion includes an activating unit that generates electric power to activate the circuit unit. Therefore, as one example, the power consumption of the battery can easily be suppressed because the activating unit is capable of activating the circuit unit.

In the door lock control system, as one example, the activating unit includes a wave detecting unit that obtains electric power from a signal different from the signal including the first data. Therefore, as one example, electric power to activate the circuit unit may be obtained more efficiently.

In the door lock control system, as one example, the activating unit includes a piezoelectric element that generates electric power in response to an operation input. Therefore, as one example, electric power generated by an operation input by the operator can be used for activating the circuit unit.

DESCRIPTION OF EMBODIMENTS

Figure 1:
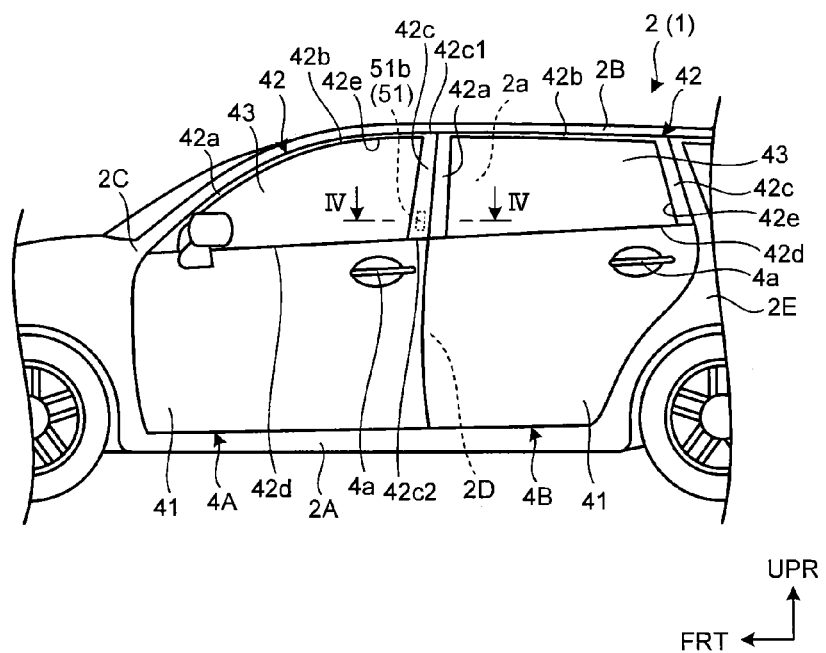
FIG. 1 is a side view of a portion of an example of a vehicle (vehicle body side structure) according to an embodiment.

Exemplary embodiments and modifications explained hereinafter include similar constituent elements. The similar constituent elements are denoted by common reference numerals and symbols, and overlapping explanation thereof is omitted. The drawings illustrate directions for the sake of convenience of explanation. UPR indicates the upper direction of the vertical direction of the vehicle (hereinafter simply referred to as upper direction or upward), FRT indicates the front direction of the vehicle front-and-rear direction (hereinafter simply referred to as front direction or front), and OTR indicates an outer direction in the vehicle width direction (outside, the left side in the present embodiment). Although FIGS. 1, 2, 4 to 7, and 10 illustrate the structure on the left side part of a vehicle cabin 2 (vehicle 1), the structure according to the present embodiment may be similarly achieved also in the right side part of the vehicle cabin 2 (vehicle 1).

In the present embodiment, the vehicle 1 may be, for example: an automobile (internal-combustion engine automobile) including an internal-combustion engine (engine, not illustrated) as a driving source; an automobile (such as an electronic automobile and a fuel cell automobile) including a motor (not illustrated) as a driving source; or an automobile (hybrid automobile) including both of them as driving sources. The vehicle 1 may be equipped with various transmissions, and various devices (systems and components) necessary for driving the internal-combustion engine or motor.

Figure 2:
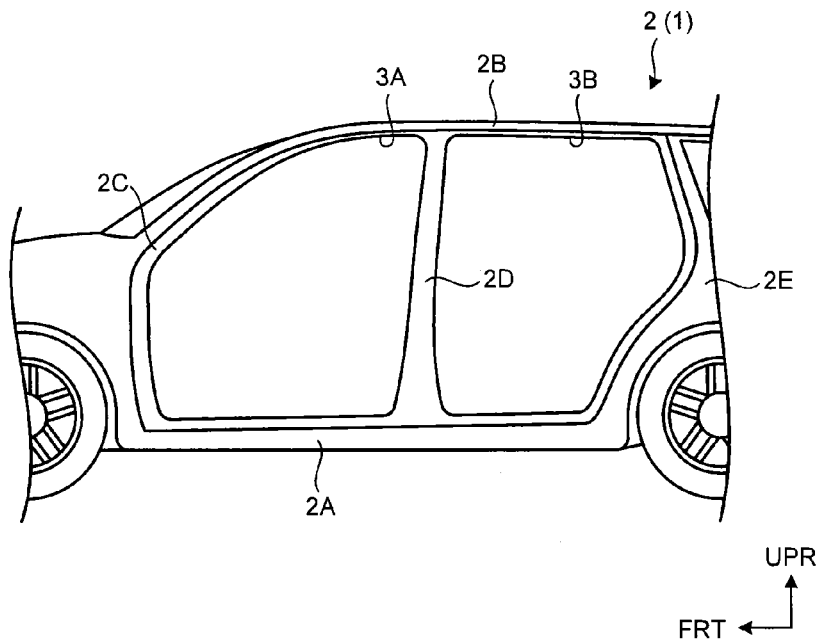
FIG. 2 is a side view illustrating a state in which doors are removed from the configuration of FIG. 1.

In the present embodiment, as an example, the vehicle cabin 2 forms a vehicle cabin 2a, as illustrated in FIG. 1 and FIG. 2. In addition, the vehicle cabin 2 includes, on each side thereof (both sides of the vehicle width direction (the direction perpendicular to the sheet surface of FIG. 1 and FIG. 2): a member 2A (a lower side member, a rocker, a side sill); a member 2B (an upper side member, a roof side rail); a member 2C (a front side member, a front pillar, an A pillar); a member 2D (a middle side member, a center pillar, a B pillar); and a member 2E (a rear side member, a rear pillar, a C pillar). The member 2A is located on an end portion of a floor panel (not illustrated) in the vehicle width direction, and extends along the front-and-rear direction of the vehicle. The member 2B is located on an end portion of a roof panel (not illustrated) in the vehicle width direction, and extends along the front-and-rear direction of the vehicle. The members 2C, 2D, and 2E extend vertically between the member 2A and the member 2B. Among the three members 2C, 2D, and 2E, the member 2C is located at a front side with respect to the other two members 2D and 2E. The member 2E is located at a rear side with respect to the other two members 2C and 2D. The member 2D is located between the two members 2C and 2E. Each of the members 2A to 2E has a hollow structure having a closed cross section, and has stiffness and strength that are higher than those of adjacent panels and the like. The inside or the outside of each of the members 2A to 2E may be properly provided with a reinforcing member (reinforcement) or the like. The members 2A to 2E serve as a basic framework that supports the vehicle cabin 2, and serve as an example of skeleton members that bear or disperse load acting on the vehicle cabin 2. As an example, the members 2A to 2E are formed of a copper sheet metal.

In the present embodiment, as an example, the vehicle cabin 2 is provided with two opening portions 3A and 3B that open the vehicle cabin 2a to the side of the vehicle, as illustrated in FIG. 2. The opening portions 3A and 3B are arranged side by side along the front-and-rear direction of the vehicle. The members 2A, 2B, 2C, and 2D are located on the peripheral edge portion of the opening portion 3A. The members 2A, 2B, 2D, and 2E are located on the peripheral edge portion of the opening portion 3B. The member 2D is located between the opening portion 3A and the opening portion 3B (boundary part). Specifically, the two opening portions 3A and 3B are separated by the member 2D. The driver and luggage and the like can enter into and move out from the vehicle cabin 2a through the opening portions 3A and 3B. The members 2A to 2E are an example of the frame of the opening portions 3A and 3B.

In the present embodiment, as an example, the vehicle cabin 2 includes doors 4A and 4B (vehicle door structure) that are capable of opening and closing to cover the opening portions 3A and 3B, as illustrated in FIG. 1. As an example, the door 4A is supported by the member 2C via a hinge (not illustrated) provided on the front side of the opening portion 3A such that the door 4A is rotatable around a rotational axis extending substantially along the vertical direction of the vehicle. The door 4B is supported by the member 2D via a hinge (not illustrated) provided on the front side of the opening portion 3B such that the door 4B is rotatable around a rotational axis extending substantially along the vertical direction of the vehicle. Specifically, each of the doors 4A and 4B is capable of opening and closing (being rotatable) in the front-and-rear direction.

In the present embodiment, as an example, each of the doors 4A and 4B includes a door outer 41 (an outer member, a wall portion, side walls, a panel), a frame 42 (a frame, a peripheral edge member, a surrounding member), a window panel 43 (window glass), a door inner (an interior portion, trim, not illustrated), an outer handle 4a (a handle, a knob, an opening and closing operating unit), and an inner handle (not illustrated). The door outer 41 is formed to have a substantially quadrilateral (as an example, a substantially rectangular) shape. The door outer 41 covers the outer side of the lower part of the door 4A or 4B. The door inner is provided on the vehicle-chamber inner side of the door outer 41. The frame 42 is located above the door outer 41 and the trim. The frame 42 includes an edge portion 42a (a front edge portion, a side edge portion), an edge portion 42b (an upper edge portion), and an edge portion 42c (a rear edge portion, a side edge portion). In each of the doors 4A and 4B, a window 42e (opening portion) is formed of the frame 42, the door outer 41, and an upper edge portion 42d (end portion) of the door inner. The edge portion 42d is an example of the lower edge portion of the window 42e. The window 42e is covered (shut) with a transparent plate-shaped window panel 43 that is capable of being opened and closed. The window panel 43 is vertically moved by an elevating device (regulator, not illustrated) provided between the door outer 41 and the door inner. The window panel 43 is formed to be movable between an upper position for covering the window 42e and a lower position located between the door outer 41 and the trim.

Figure 3:
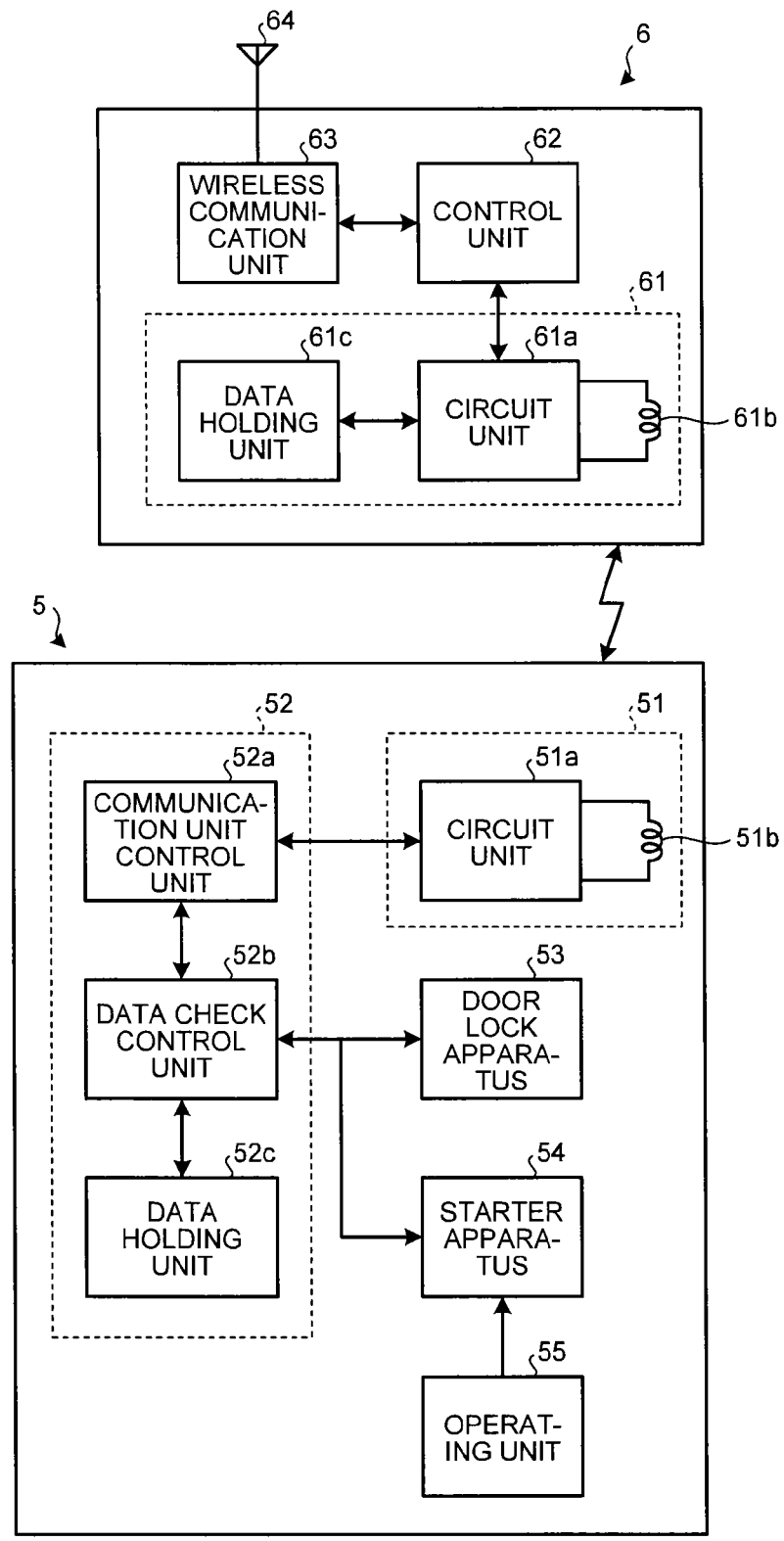
FIG. 3 is a schematic block diagram of one example of a control system and a portable terminal according to the embodiment.

In the present embodiment, as an example, the vehicle 1 includes a door lock apparatus 53, as illustrated in FIG. 3. The door lock apparatus 53 is provided on each of the doors 4A and 4B. As an example, the door lock apparatus 53 moves a movable portion (not illustrated) between a locking position and an unlocking position by electromagnetic force. In a state where the movable portion is in the locking position (locked state), the doors 4A and 4B are locked in a state where the opening portions 3A and 3B are closed (shut), and cannot be opened or closed by the operator's operation of the outer handle 4a or an inner handle (not illustrated). In a state where the movable portion is in the unlocking position (unlocked state), the doors 4A and 4B are not locked, and can be opened and closed in response to the operator's operation of the outer handle 4a or the inner handle. Generally, although a plurality of door lock apparatuses 53 that are provided on the respective doors 4A and 4B are controlled to the same state (status, the locked state or the unlocked state), the structure is not limited thereto. For example, the door lock apparatuses 53 may have different states for respective regions (positions), for example, the states are different between the right side and the left side of the vehicle width direction, and the rear side of the front-and-rear direction of the vehicle.

In the present embodiment, as an example, a control system 5 related to lock of the doors 4A and 4B of the vehicle 1 illustrated in FIG. 3 is constructed as an electronic key system (keyless entry system), without using mechanical keys. Specifically, the control system 5 communicates with a device 6 (communication device such as a mobile phone, a smart phone, a non-contact IC card, and an RF-ID tag) that is held by the operator and capable of performing communication, and checks (compares) first data (such as an identification code of the device 6) obtained from the device 6 with second data (such as an identification code of the device 6 registered in advance) held in the control system 5. As a result of checking (comparison), when the first data corresponds to (for example, agrees with) the second data, the control system 5 controls the door lock apparatus 53 to move the movable portion and switch the door lock state (locked state or unlocked state). The locked state and the unlocked state are alternately switched. Specifically, when communication is performed between the control system 5 and the device 6 in the locked state and the first data corresponds to the second data as a result of checking, the control system 5 switches the door lock apparatus 53 to the unlocked state. By contrast, when communication is performed between the control system 5 and the device 6 in the unlocked state and the first data corresponds to the second data as a result of checking, the control system 5 switches the door lock apparatus 53 to the locked state. In the present embodiment, the control system 5 is an example of the door lock control system.

In the present embodiment, as an example, communication between the control system 5 and the device 6 is performed by near field communication (NFC, non-contact communication). Examples of the near field communication that can be adopted in the control system 5 and the device 6 according to the present embodiment are ISO/IEC 18092, FeLiCa (registered trademark), and ISO/IEC 14443 (MIFARE (registered trademark)). An antenna 51b and an antenna 61b perform communication between the control system 5 and the device 6. In the present embodiment, communication between the control system 5 and the device 6 is performed when the antenna 51b and the antenna 61b are positioned at a close distance (for example, within several centimeters). Specifically, communication between the control system 5 and the device 6 is performed when the operator brings a communication unit 61 (the antenna 61b thereof) of the held device 6 to be held over (superimposed on, close to, opposed to) a communication unit 51 (the antenna 51b thereof) of the control system 5.

In the present embodiment, as an example, the communication unit 51 including the antenna 51b is provided in the edge portion 42c (a rear edge portion, a side edge portion) of the frame 42 of the door 4A located in the front among the two doors 4A and 4B, as illustrated in FIG. 1. The edge portion 42c is located on the vehicle chamber outer side of the boundary part (member 2D) between the two opening portions 3A and 3B. According to the present embodiment with this structure, as an example, the position of the antenna 51b of the communication unit 51 is relatively close to the operator, both in the case where the operator opens the door 4A to enter the vehicle cabin 2a through the opening portion 3A, and in the case where the operator opens the door 4B to enter the vehicle cabin 2a through the opening portion 3B. For this reason, as an example, the operator can bring the antenna 61b of the held device 6 close to the antenna 51b of the communication unit 51 more easily or more promptly. In the present embodiment, as an example, the communication unit 51 including the antenna 51b is provided in a position closer to a lower end portion 42c2 than an upper end portion 42c1 in a longitudinal direction (vertical direction) of the edge portion 42c of the door 4A. This structure enables the operator to bring the antenna 61b of the device 6 close to the antenna 51b of the communication unit 51 more easily or more promptly than the case where the antenna 51b is located in the longitudinal upper end, as an example. The antenna 51b may be provided in the edge portion 42a (a front edge portion, a side edge portion) of the frame 42 of the door 4B located in the rear among the two doors 4A and 4B. Also in this case, the same result (effect) is obtained as in the case where the antenna 51b is provided in the edge portion 42c of the door 4A. The communication unit 51 is also located upper than the outer handle 4a.

In the present embodiment, as an example, the control system 5 includes the communication unit 51 (a communication portion, a communication unit, a wireless communication unit), a control unit 52, the door lock apparatus 53, a starter apparatus 54, and an operating unit 55, as illustrated in FIG. 3. The communication unit 51 (reader and writer) includes a circuit unit 51a, and the antenna 51b (such as an antenna coil). The communication unit 51 transmits and receives a signal (electric wave) to and from the communication unit 61 by electromagnetic induction with the communication unit 61 of the device 6. The communication unit 51 is an example of a receiving unit. The circuit unit 51a performs modulation of the transmission signal, and demodulation and amplification of the reception signal, for example. As an example, the antenna 51b is an antenna coil (loop antenna) obtained by winding a wire-shaped conductor a plurality of times. The antenna 51b forms a series resonant circuit together with a capacitor (not illustrated).

In the present embodiment, as an example, the control unit 52 includes a communication unit control unit 52a (communication unit electronic control unit (ECU)), a data check control unit 52b (data check ECU), and a data holding unit 52c (storage unit). The communication unit control unit 52a controls the communication unit 51. The communication unit 51 is controlled by the communication unit control unit 52a to transmit a driving signal. When the communication unit 51 receives a response signal that corresponds to the driving signal and is transmitted from the device 6, the communication unit control unit 52a transmits first data (such as an identification code) included in the response signal to the data check control unit 52b. The data holding unit 52c is a non-volatile storage unit, such as a flash memory and a non-volatile random access memory (NVRAM). The data holding unit 52c holds (stores) second data (such as an identification code) registered in advance. The data check control unit 52b checks (compares) the second data (such as an identification code) held in the data holding unit 52c with the first data from the device 6 to determine whether the first data corresponds to the second data. When the first data corresponds to (for example, agrees with) the second data, the data check control unit 52b controls the door lock apparatus 53 to change the door lock state (the locked state or the unlocked state). By contrast, when the first data does not correspond to (for example, does not agree with) the second data as a result of check (comparison) by the data check control unit 52b, the data check control unit 52b performs control to maintain the door lock state (the locked state or the unlocked state). Specifically, the data check control unit 52b is an example of a determination unit that determines whether to unlock or lock the doors 4A and 4B based on the first data and the second data. In addition, the data check control unit 52b controls the starter apparatus 54 to start the vehicle driving device (such as an engine and a motor) or change the vehicle driving device to an operable state in response to an operation input in the operating unit 55 (such as a knob, a switch, and a push button). Specifically, the control system 5 is also an example of an immobilizer system.

In the present embodiment, as an example, the device 6 may be formed as a mobile phone or a smart phone. The device 6 includes the communication unit 61 (a wireless communication unit, a first communication unit), a control unit 62, a wireless communication unit 63 (a communication unit, a second communication unit), and an antenna 64. The communication unit 61 (reader and writer) includes a circuit unit 61a, the antenna 61b (such as an antenna coil), and a data holding unit 61c. The communication unit 61 transmits and receives a signal (electric wave) to and from the communication unit 51 by electromagnetic induction with the communication unit 51 of the control system 5. The circuit unit 61a performs modulation of the transmission signal, and demodulation and amplification of the reception signal, for example. As an example, the antenna 61b is an antenna coil (loop antenna) obtained by winding a wire-shaped conductor a plurality of times. The antenna 61b forms a series resonant circuit together with a capacitor (not illustrated). The data holding unit 61c is a non-volatile storage unit, such as a read only memory (ROM), a flash memory, and a non-volatile random access memory (NVRAM). The data holding unit 61c holds (stores) first data (such as an identification code) registered in advance. When the communication unit 61 receives a driving signal from the communication unit 51, the communication unit 61 is activated and transmits a response signal including the first data. The control unit 62 controls the components of the device 6, such as the wireless communication unit 63, to perform wireless communication (transmission and reception), such as a telephone call and data communication, via the antenna 64.

Figure 4:
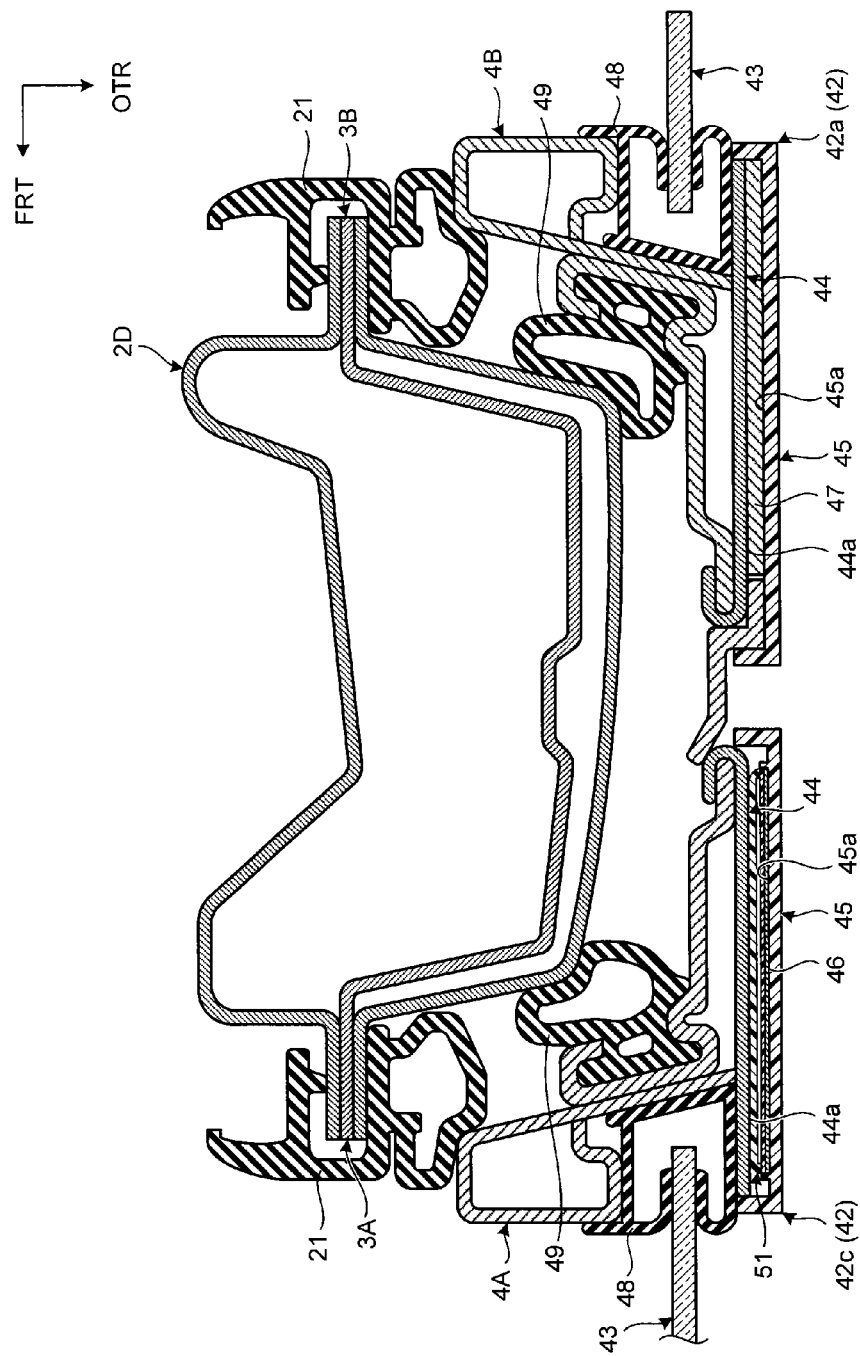
FIG. 4 is a cross-sectional view taken along line IV-IV of FIG. 1.

In the present embodiment, as an example, each of the edge portion 42c of the door 4A and the edge portion 42a of the door 4B includes a member 44 (an inner member, a first member, a base, an inner) inside the vehicle cabin, and a member 45 (an outer member, a second member, a door member, a garnish, a cover, an outer) outside the vehicle cabin, as illustrated in FIG. 4. The member 44 is formed of a conductive material (a metal material such as a steel plate), and the member 45 is formed of a non-conductive material (an insulating material, a synthetic resin material, plastic, engineering plastic). The member 44 and the member 45 are bonded (connected) to each other by a double-sided tape 47, as an example. The double-sided tape 47 is held between a surface 44a (an outer surface, a front surface) of the member 44 and a surface 45a (an inner surface, a back surface) of the member 45 in the edge portion 42a and a region of the edge portion 42c that is different from a region provided with the communication unit 51. The member 44 and the member 45 may be coupled to each other by, for example, hooking between recessed and projecting structures, coupling using coupling tools (such as a screw and a clip), or a hooking structure (snap fit) in which at least one of them is at least partly elastically deformed in coupling.

In the present embodiment, as an example, the communication unit 51 is located in the edge portion 42c of the door 4A, that is, between the member 44 and the member 45, as illustrated in FIG. 4. Specifically, the member 45 formed of a non-conductive material that does not serve as an electromagnetic shield is located on the communication unit 51 on the outer side of the vehicle cabin. With this structure, when the device 6 is positioned around the communication unit 51 on the outer side of the vehicle chamber, the member 45 is easily prevented from interrupting communication between the communication unit 51 and the device 6.

In the present embodiment, as an example, seal members 21 and 49 (weather strip) are provided between the member 2D of the vehicle cabin 2 and the doors 4A and 4B, respectively, as illustrated in FIG. 4. A seal member 48 (weather strip) is provided between the frame 42 and the window panel 43. Each of the seal members 21, 48, and 49 is formed of an elastic material such as elastomer.

Figure 5:
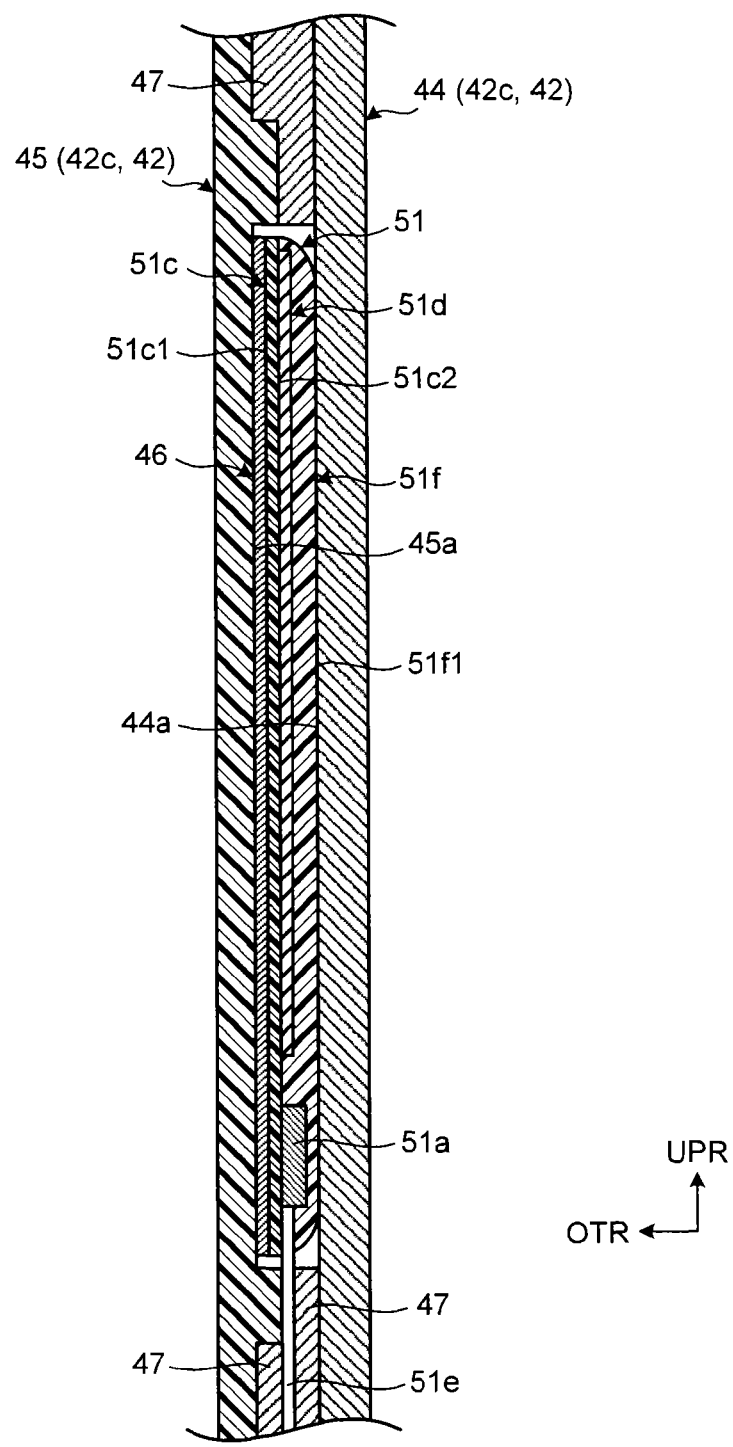
FIG. 5 is a schematic vertical sectional view of a portion of the door including a communication unit which serves as one example of the control system according to the embodiment.
Figure 6:
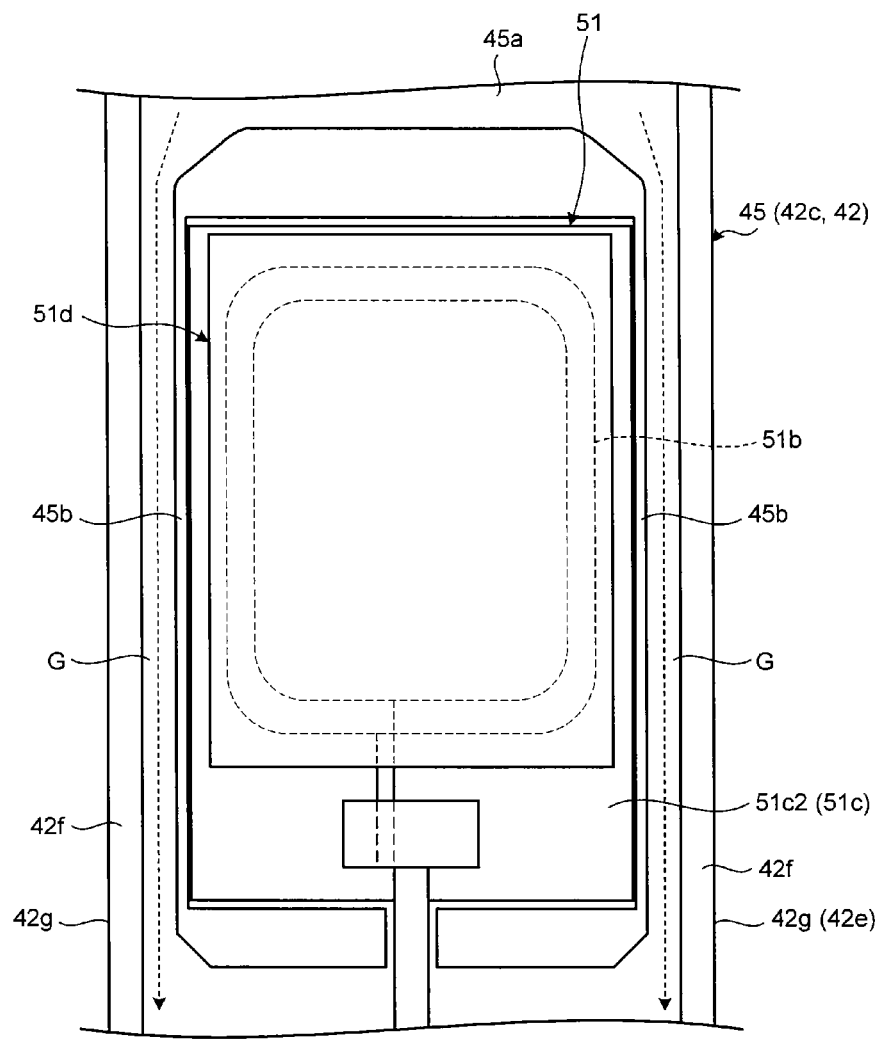
FIG. 6 is a schematic side view (as viewed from an inside of a vehicle cabin) of a portion of the door and the communication unit of FIG. 5, and illustrating a state in which a cover portion of the communication unit is removed.
Figure 7:
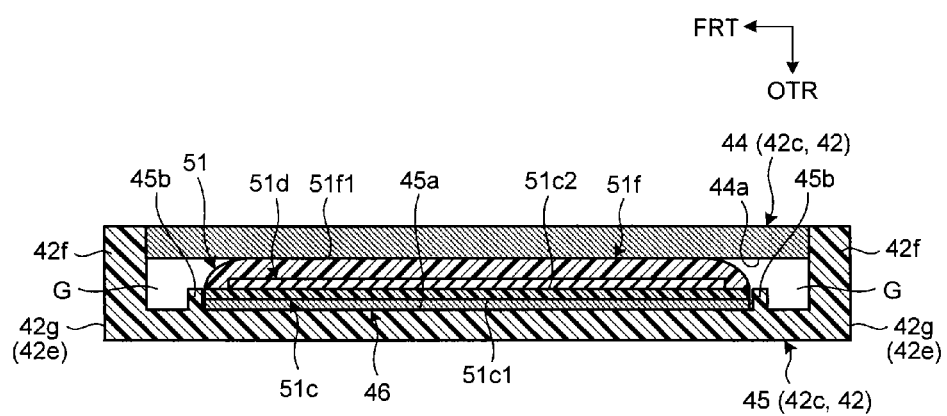
FIG. 7 is a schematic horizontal sectional view of a portion of the door including the communication unit of FIG. 5.

In the present embodiment, as an example, the communication unit 51 includes a board 51c, as illustrated in FIG. 5 to FIG. 7. The board 51c may be, for example, a flexible printed circuit (FPC), or a rigid board. The board 51c has a surface 51c1 on the side of the member 45 (outer side of the vehicle cabin) and a surface 51c2 (on the side of the member 44, inner side of the vehicle cabin) opposite the surface 51c1, and has a quadrilateral (as an example, a substantial rectangular) shape and a sheet-like shape (a film-like shape, a thin-plate shape). The antenna 51b can be formed as a conductor pattern (conductor layer) provided on the board 51c. The antenna 51b is covered with an insulator. The circuit unit 51a (a device, a package) is mounted to the surface 51c2. The circuit unit 51a is connected to a harness 51e (wire). The harness 51e includes a lead wire (not illustrated) that electrically connects the circuit unit 51a with the control unit 52. The lead wire is covered with an insulating film (layer, coating).

In the present embodiment, as an example, a magnetic sheet 51d (magnetic member) is located on the surface 51c2. The magnetic sheet 51d covers the antenna 51b on the side of the member 44. When the member 44 formed of a conductive material (metal material) and the member 2D (see FIG. 4) are located on the inner side of the vehicle cabin of the antenna 51b, the communication performance of the antenna 51b may deteriorate. This may be caused by reduction in the magnetic flux of the antenna 51b due to eddy current generated in the conductive members 44 and 2D, or the like. When the magnetic sheet 51d is provided, the magnetic flux from the antenna 51b is focused on the magnetic sheet 51d, and generation of eddy current is suppressed. This structure suppresses reduction in the communication performance of the antenna 51b as described above. For example, the magnetic sheet 51d can be formed as a sheet of a synthetic resin material including a filler of a magnetic material such as ferrite. The magnetic sheet 51d may be integrated with the board 51c, for example, with an adhesive or the like.

In the present embodiment, as an example, a waterproofed cover portion 51f covers the board 51c, the circuit unit 51a, the magnetic sheet 51d, and the harness 51e (on the side of the surface 51c2 of the board 51c), as illustrated in FIG. 5 and FIG. 7. For example, the cover portion 51f may be formed of a synthetic resin material formed by molding or application, or as a coating film. The cover portion 51f enables easy reduction in influence of moisture (such as occurrence of rust) on the conductor portions (electrically connected portions) such as the board 51c, the circuit unit 51a, and the harness 51e. The cover portion 51f enables easy improvement in protectiveness of the components included in the communication unit 51. When the cover portion 51f is formed of a material having flexibility (elasticity), the cover portion 51f further improves protectiveness of the components included in the communication unit 51. A top portion 51f1 of the cover portion 51f abuts against the surface 44a of the member 44. This structure enables easier suppression of occurrence of noise caused by abutment of the communication unit 51 against the member 44 than the case without the cover portion 51f, the case where the cover portion 51f is formed of a hard material, or the case where a space exists between the cover portion 51f and the member 44.

In the present embodiment, as an example, the communication unit 51 is attached to the member 45. Accordingly, the communication unit 51 can be handled as a subassembly integrated with the member 45. Specifically, the communication unit 51 can be relatively easily integrated with the vehicle cabin 2 and separated from the vehicle cabin 2, with attachment and detachment of the member 45 (subassembly) on the outer side of the vehicle cabin. As an example, presence and absence of the communication unit 51 can be relatively easily changed by exchanging the member 45 including the communication unit 51 with another member 45 including no communication unit 51. This structure enables easy reduction in labor and cost required for assembly and maintenance of the communication unit 51, as an example. In the present embodiment, as an example, the communication unit 51 and the member 45 are bonded (connected) to each other with, for example, a double-sided tape 46. The double-sided tape 46 is held between the surface 45a (an inner surface, a back surface) of the member 45 and the surface 51c1 of the board 51c. The communication unit 51 and the member 45 may be coupled to each other by, for example, hooking between recessed and projecting structures, coupling using coupling tools (such as a screw and a clip), or a hooking structure (snap fit) in which at least one of them is at least partly elastically deformed in coupling.

In the present embodiment, as an example, a gap G is provided between the communication unit 51 and an end portion 42g (wall portion 42f) in the vehicle front-and-rear direction (the width direction in a side view of the edge portion 42c) of the edge portion 42c, between the member 44 and the member 45, as illustrated in FIG. 6 and FIG. 7. The gap G may serve as a path of water that flows (passes) through the inside of the edge portion 42c. With this structure, water does not easily act on the communication unit 51 in comparison with the case without the gap G. In the present embodiment, as an example, the member 45 is provided with a wall portion 45b (projecting portion) that surrounds the communication unit 51. For this reason, water that passes on the surface 45a of the member 45 does not easily reach the communication unit 51. Although the gap G is provided on both sides of the vehicle front-and-rear direction of the communication unit 51 as an example in the present embodiment, the gap G may be provided on only one side.

As explained above, in the present embodiment, the communication unit 51 (receiver) including the antenna 51b of the door lock control system 5 is provided in the edge portion 42c (side edge portion) extending between the edge portion 42b (upper edge portion) and the edge portion 42d (lower edge portion) of the window 42e of the door 4A, as an example. With the structure, according to the present embodiment, the operator (user) can relatively easily bring the device 6 that transmits first data close to the communication unit 51 when going into or out of the vehicle cabin, as an example.

In addition, in the present embodiment, as an example, the edge portion 42c includes the member 44 (first member) and the member 45 (second member) that covers the outer side of the vehicle cabin of the member 44 and is formed of a non-conductive material, and the communication unit 51 is provided between the member 44 and the member 45. According to the present embodiment with this structure, the communication unit 51 can be concealed inside the edge portion 42c, as an example. As an example, because the member 45 on the outer side of the vehicle cabin of the communication unit 51 is formed of a non-conductive material, communication of the communication unit 51 is hardly obstructed.

In the present embodiment, as an example, the communication unit 51 is attached to the member 45. This structure enables relatively easy attachment and detachment of the communication unit 51, with attachment and detachment of the member 45 on the outer side of the vehicle cabin, as an example. In addition, as an example, presence and absence of the communication unit 51 can be relatively easily changed by exchange of the member 45.

In the present embodiment, as an example, the communication unit 51 includes the antenna 51b, the member 44 and the member 2D are formed of conductive materials, and the communication unit 51 is provided with the magnetic sheet 51d (magnetic member) covering a portion of the antenna 51b on the side of the member 44 and the member 2D. Therefore, as one example, lowering in the communication performance of the antenna 51b due to the member 44 and the member 2D can easily be suppressed.

<First Modification>

Figure 8:
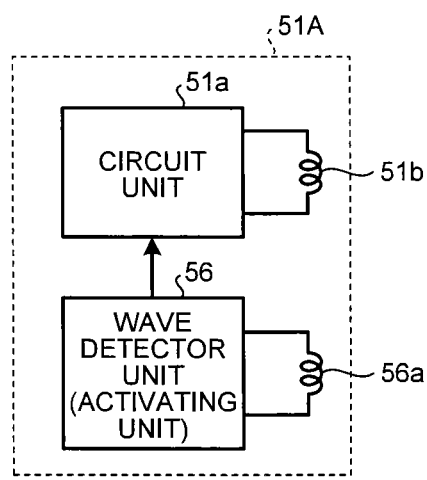
FIG. 8 is a block diagram of one example of a communication unit according to a first modification.

A first modification illustrated in FIG. 8 is different from the above embodiment in the structure of a communication unit 51A. The communication unit 51A can be achieved as a replacement for the communication unit 51 of the above embodiment. The structure of the present modification other than the communication unit 51A is the same as that of the above embodiment. Accordingly, the present modification can produce the same function and result (effect) based on the structure similar to that of the above embodiment. The communication unit 51A according to the present modification includes a wave detector unit 56 and an antenna 56a. The electric power obtained by the wave detector unit 56 is used for activating (for example, transmission of a driving signal from the antenna 51b) of the circuit unit 51a. Accordingly, the wave detector unit 56 is an example of the activating unit. The communication unit 51A may be configured to be supplied with electric power from a battery (not illustrated) after the communication unit 51A is activated once. When the communication unit 51A includes no wave detector unit 56 (activating unit), the circuit unit 51*a* may require a structure for intermittently transmitting a signal (electric wave) from the antenna 51*b*. In such a case, power consumption of the battery may increase more easily. With respect to this point, because the present modification enables the electric power obtained by the wave detector unit 56 to be used for activating the circuit unit 51*a*, power consumption of the battery can be reduced more. Specifically, the wave detector unit 56 may be formed as, for example, a publicly known voltage doubler wave detecting circuit, a voltage doubler rectifier circuit, a diode wave detecting circuit, and a boosting circuit using a transformer. The specifications of the wave detector unit 56 and the antenna 56*a* are properly set according to a signal (electric wave) to be used (received) and the structure of the vehicle cabin 2 and the like. The wave detector unit 56 is also capable of receiving a signal (such as a control signal of the mobile phone and noise of the mobile phone) different from the signal including the first data with the antenna 56*a*, and obtaining electric power from the signal. Accordingly, the structure according to the present modification is more effective because electric power is obtained by the wave detector unit 56 when the device 6 is brought close to the communication unit 51A in the case where the device 6 is a mobile phone. The antenna 56*a* may be provided as, for example, an antenna coil that is wound inside (or outside) the antenna 51*b*, or an antenna of another form.

<Second Modification>

Figure 9:
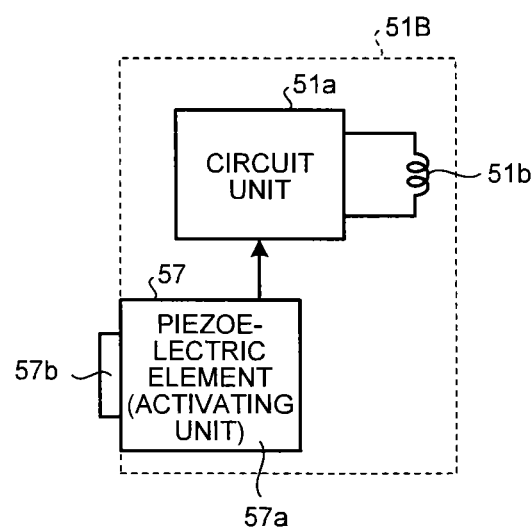
FIG. 9 is a block diagram of one example of a communication unit according to a second modification.
Figure 10:
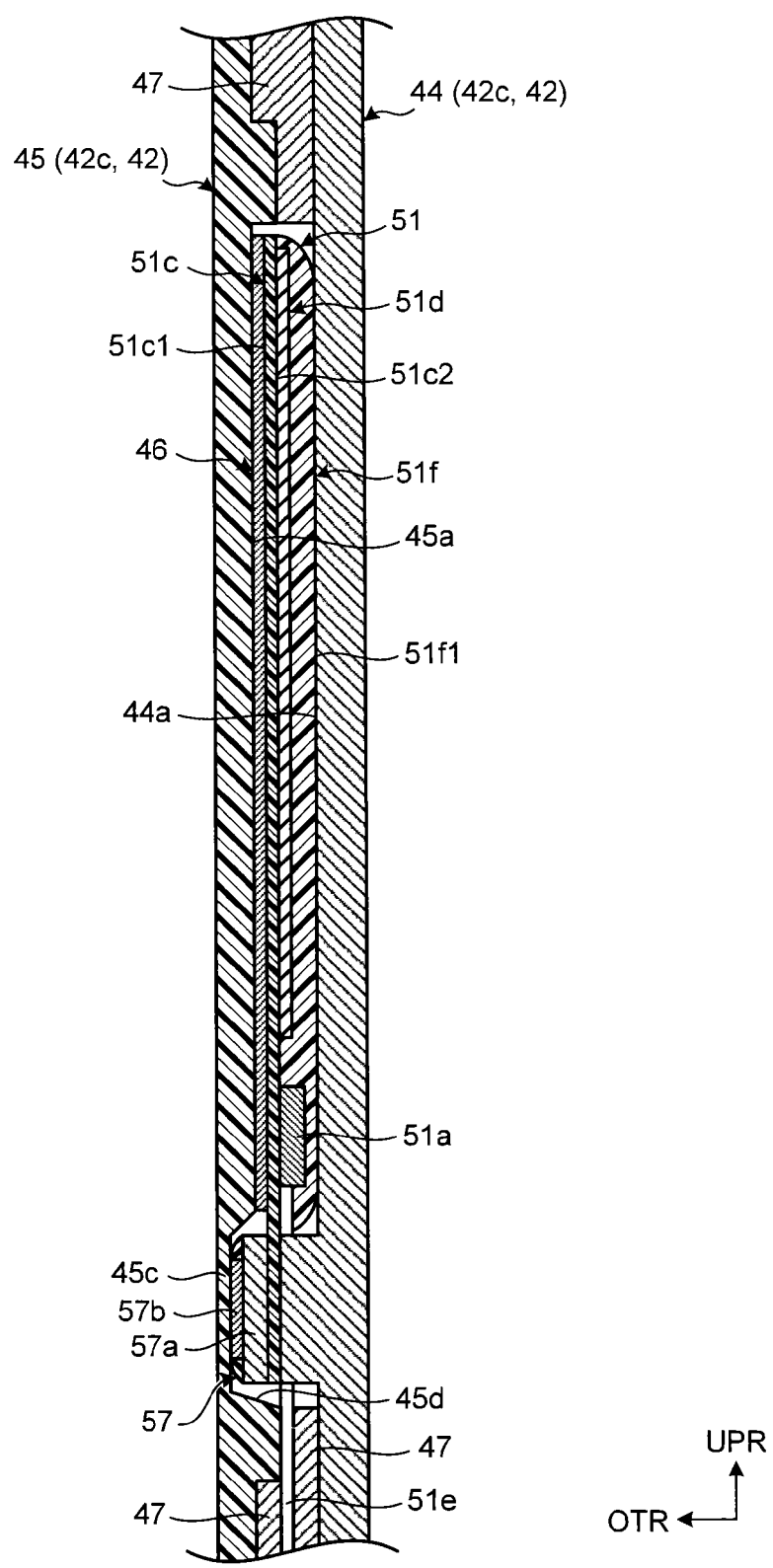
FIG. 10 is a schematic vertical sectional view of a portion of a door including one example of the communication unit according to the second modification.

A second modification illustrated in FIG. 9 and FIG. 10 is different from the above embodiment in the structure of a communication unit 51B. The communication unit 51B can be achieved as a replacement for the communication unit 51 of the above embodiment. The structure of the present modification other than the communication unit 51B is the same as that of the above embodiment. Accordingly, the present modification can produce the same function and result (effect) based on the structure similar to that of the above embodiment. The communication unit 51B according to the present modification includes a piezoelectric element 57. The electric power obtained by the piezoelectric element 57 is used for activating (for example, transmission of a driving signal from the antenna 51*b*) the circuit unit 51*a*. Accordingly, the piezoelectric element 57 is an example of the activating unit. The communication unit 51B may be configured to be supplied with electric power from a battery (not illustrated) after the communication unit 51B is started once. When the communication unit 51B includes no piezoelectric element 57 (starting unit), the circuit unit 51*a* may require a structure for intermittently transmitting a signal (electric wave) from the antenna 51*b*. In such a case, power consumption of the battery may increase more easily. With respect to this point, because the present modification enables the electric power obtained by the piezoelectric element 57 to be used for activating the circuit unit 51*a*, power consumption of the battery can be reduced more. The piezoelectric element 57 includes a body 57*a*, and an operating unit 57*b* that is supported by the body 57*a* to project and retract. The piezoelectric element 57 converts pressing force on the operating unit 57*b* into electric power. The piezoelectric element 57 may be properly provided with a boosting circuit or the like.

In the present modification, as an example, the piezoelectric element 57 may be mounted on the board 51*c* as illustrated in FIG. 10. The member 45 is provided with a thin portion 45*c* (a pressing portion, a cover portion) having a thickness smaller than that of the other parts. The thin portion 45*c* can be formed by providing a recessed portion 45*d* in a portion of the member 45 on the side of the member 44 (the inner side of the vehicle cabin, a back side). The member 45 can be formed of a synthetic resin material or the like. In this case, the thin portion 45*c* can be formed as a region that has flexibility (flexible) and is capable of being elastically displaced (elastically deformed). According to the present modification, the member 45 does not require an opening portion, which can lead to easy prevention of entering of water or dust through the opening portion, as an example. In addition, the piezoelectric element 57 can be provided without being exposed. The pressing position (the position of the thin portion 45*c*) can be properly displayed on the outer surface of the member 45 by printing or with a seal.

Although the embodiment of the present invention is illustrated above, the above embodiment and modifications are mere examples, and are not aimed at restricting the range of the invention. These embodiments and modifications may be executed in other various forms. Various omissions, replacements, combinations, and changes are possible without departing from the gist of the invention. Structures and shapes of the embodiments and modifications may be partly exchanged in execution. The specifications (structure, type, direction, shape, size, length, width, thickness, height, number, arrangement, position, and material) of each structure and shape may be properly changed in execution. For example, the receiving gunit (the antenna, the circuit unit, the communication unit) may be formed as one unitary piece with the second member by insert molding of the second member. In addition, the communication unit provided in the door may have the data check controller (determination unit).

The vehicle body side structure according to the above embodiment includes the frame member positioned on the peripheral edge portion of the opening portion provided in the vehicle body side portion, the door capable of opening and closing to cover the opening portion, the door lock device that locks the door in the closed state, and the receiving unit that is provided in the side edge portion extending between the upper edge portion and the lower edge portion of the window provided in the door and switches the lock state of the door by the door lock device by near field communication, as an example. This structure enables the user to relatively easily bring the device that transmits first data close to the receiving unit when going into or moving out from the vehicle cabin, as an example.

In addition, the above vehicle body side structure has a structure in which the vehicle body side portion is provided with two opening portions along the front-and-rear direction of the vehicle, and the receiving unit is positioned at the boundary portion between the two opening portions on the outer side of the vehicle cabin, as an example. This structure enables the user to relatively easily bring the device that transmits the first data close to the receiving unit when going into or moving out from the vehicle cabin through either of the opening portions (doors), as an example.

The vehicle door structure according to the above embodiment includes the door panel, the side edge portion extending between the upper edge portion and the lower edge portion of the window positioned above the door panel, and the receiving unit that is provided in the side edge portion and receives a signal by near field communication, as an example. This structure enables the user to relatively easily bring the device that transmits the first data close to the receiving unit when going into or moving out from the vehicle chamber, as an example.

The door member according to the above embodiment is a door member that covers, on the outer side of the vehicle cabin, a member formed of a metal material in the side edge portion extending between the upper edge portion and the lower edge portion of the window of the vehicle door and is formed of a non-conductive material, and the door member is provided with a receiving unit that receives a signal by near field communication, as an example. This structure enables relatively easy attachment and detachment of the receiving unit, with attachment and detachment of the second member of the vehicle chamber outer side, as an example. This structure also enables relatively easy change of presence and absence of the receiving unit in the vehicle by exchange of the door member, as an example.

REFERENCE SIGNS LIST

1 VEHICLE
2 VEHICLE BODY (VEHICLE BODY SIDE STRUCTURE)
2A TO 2E MEMBER (FRAME MEMBER)
2D MEMBER (BOUNDARY PART)
3A OPENING PORTION
3B OPENING PORTION
4A DOOR
4B DOOR
42a EDGE PORTION (SIDE EDGE PORTION)
42b EDGE PORTION (UPPER EDGE PORTION)
42c EDGE PORTION (SIDE EDGE PORTION)
42d EDGE PORTION (LOWER EDGE PORTION)
42e WINDOW
42g END PORTION
44 MEMBER (FIRST MEMBER)
45 MEMBER (SECOND MEMBER, DOOR MEMBER)
5 CONTROL SYSTEM (DOOR LOCK CONTROL SYSTEM)
51, 51A, 51B COMMUNICATION UNIT (RECEIVING UNIT)
51a CIRCUIT UNIT
51b ANTENNA
51d MAGNETIC SHEET (MAGNETIC MEMBER)
51f COVER PORTION
52b DATA CHECK CONTROL UNIT (DETERMINATION UNIT)
56 WAVE DETECTING UNIT (ACTIVATING UNIT)
57 PIEZOELECTRIC ELEMENT (ACTIVATING UNIT)

The invention claimed is:

1. A door lock control system comprising:
a receiving unit that is provided to a side edge portion extending between an upper edge portion and a lower edge portion of a window of a vehicle door, and receives a signal by near field communication; and
a determination unit that determines whether to unlock or lock the door based on first data included in the signal received by the receiving unit and held second data, wherein
the side edge portion includes a first member and a second member, the second member covering an outer side of the first member with respect to a vehicle cabin and formed of a non-conductive material,
the receiving unit is provided between the first member and the second member, and
a gap is provided between the first member and the second member and between the receiving unit and an end portion of the side edge portion in a vehicle front-and-rear direction.

2. The door lock control system according to claim 1, wherein the receiving unit is attached to the second member.

3. The door lock control system according to claim 1, comprising a magnetic member, wherein the receiving unit includes an antenna, the first member is formed of a conductive material, and the magnetic member covers the antenna on the first member side.

4. The door lock control system according to claim 1, wherein the receiving unit includes a waterproofed cover portion.

5. The door lock control system according to claim 1, wherein the receiving unit includes an antenna and a circuit unit that processes a signal received by the antenna, and the side edge portion includes an activating unit that generates electric power to activate the circuit unit.

6. The door lock control system according to claim 5, wherein the activating unit includes a wave detecting unit that obtains electric power from a signal different from the signal including the first data.

7. The door lock control system according to claim 5, wherein the activating unit includes a piezoelectric element that generates electric power in response to an operation input.

* * * * *